(12) United States Patent
Buelow

(10) Patent No.: US 10,750,672 B2
(45) Date of Patent: Aug. 25, 2020

(54) LEAF COLOR PATTERN CREATION

(71) Applicant: Just Greens, LLC, Newark, NJ (US)

(72) Inventor: Roger Buelow, Pepper Pike, OH (US)

(73) Assignee: Just Greens, LLC, Newark, NJ (US)

( * ) Notice: Subject to any disclaimer, the term of this patent is extended or adjusted under 35 U.S.C. 154(b) by 515 days.

(21) Appl. No.: 15/643,688

(22) Filed: Jul. 7, 2017

(65) Prior Publication Data

US 2018/0014469 A1    Jan. 18, 2018

Related U.S. Application Data

(60) Provisional application No. 62/361,568, filed on Jul. 13, 2016.

(51) Int. Cl.
| | |
|---|---|
| *A01G 7/04* | (2006.01) |
| *F21V 9/32* | (2018.01) |
| *F21V 13/08* | (2006.01) |
| *F21V 11/00* | (2015.01) |
| *G09F 23/00* | (2006.01) |
| *F21V 9/08* | (2018.01) |
| *F21V 23/04* | (2006.01) |

(Continued)

(52) U.S. Cl.
CPC ............... *A01G 7/045* (2013.01); *F21V 9/32* (2018.02); *F21V 11/00* (2013.01); *F21V 13/08* (2013.01);

(Continued)

(58) Field of Classification Search
CPC .. A01G 7/045; A01G 7/04; A23L 5/40; A23N 15/06
See application file for complete search history.

(56) References Cited

U.S. PATENT DOCUMENTS 5,660,747 A * 8/1997 Drouillard ............ A01J 27/005
                                                   219/121.69
5,872,655 A    2/1999 Seddon et al.
(Continued)

FOREIGN PATENT DOCUMENTS

| JP | H09-9783 A | 1/1997 |
| WO | WO 2014/085626 A1 | 6/2014 |
| WO | WO 2017/194502 A1 | 11/2017 |

OTHER PUBLICATIONS

Piringer, et al., "Effect of Light on the Formation of a Pigment in the Tomato Fruit Cuticle", Plant Physiology, Sep. 1954, 29 (5) 467-472; DOI: 10.1104/pp. 29.5.467.

(Continued)

*Primary Examiner* — Kristen C Hayes
(74) *Attorney, Agent, or Firm* — McCarter & English, LLP; John Pillion

(57) ABSTRACT

A device and method for altering biochrome ratios in plant leaves is provided. The device and method generally include a a light source; and means of directing the light source to deliver an altering spectrum to a group of cells. The altering spectrum alters the biochrome content of a group of cells to produce a contrasting color that creates a desired pattern on a leaf. The device may include a first light source that emits a main growth spectrum, a second light source that emits an altering spectrum; and means of directing the first and second light source to a group of cells, wherein the altering spectrum alters the biochrome content of a group of cells to create a desired pattern on a leaf. Methods of altering the biochrome ratio in a group of cells on a leaf generally involve aligning a surface of a leaf with a light source, activating the light source to produce an altering spectrum, and directing the altering spectrum towards the leaf to create a pattern, wherein cells of the leaf exposed to the altering spectrum exhibit a desired pattern.

33 Claims, 16 Drawing Sheets

(52) U.S. Cl.
CPC ............... *G09F 23/00* (2013.01); *F21V 9/08* (2013.01); *F21V 23/0457* (2013.01); *Y02P 60/146* (2015.11)

(56) References Cited

U.S. PATENT DOCUMENTS

| | | | |
|---|---|---|---|
| 5,897,797 | A | 4/1999 | Drouillard et al. |
| 6,172,328 | B1* | 1/2001 | Jones ............... A24C 1/42 219/121.68 |
| 6,508,579 | B1 | 1/2003 | Ruud et al. |
| 2007/0252006 | A1 | 11/2007 | Heck et al. |
| 2008/0298052 | A1 | 12/2008 | Hurst et al. |
| 2009/0100545 | A1 | 4/2009 | Breusegem et al. |
| 2011/0219648 | A1 | 9/2011 | James et al. |
| 2013/0307406 | A1 | 11/2013 | Hosokawa et al. |
| 2018/0054975 | A1* | 3/2018 | Shur ................ A01G 22/00 |
| 2019/0142038 | A1* | 5/2019 | Nicole ............... A01G 7/00 426/250 |

OTHER PUBLICATIONS

Dussi et al., "Characterizing and Quantifying Anthocyanins in Red Pears and the Effect of Light Quality on Fruit Color", Journal of American Society for Horticultural Science, vol. 120(5), pp. 785-789, 1995.

Osmond et al., "Photoinhibitory printing on leaves, visualized by chlorophyll fluorescence imaging and confocal microscopy, is due to diminished fluorescence from grana", Australian Journal of Plant Physiology, vol. 26(7), pp. 717-724, 1999.

Oikawa et al., "Chloroplast Unusual Positioning Is Essential for Proper Chloroplast Positioning", The Plant Cell, vol. 15, pp. 2805-2815, Dec. 2003.

Hangarter, et al., "Pictorial demonstrations of photosynthesis", Photosynthesis Research, vol. 80, pp. 421-425, 2004.

Riar et al., "Changes in cotton leaf pigmentation after abnormal exposure to sunlight", E3 Journal of Agricultural Research and Development vol. 2(1), pp. 007-013, Mar. 2013.

Owen, et al., "End-of-production Supplemental Lighting with Red and Blue Light-emitting Diodes (LEDs) Influences Red Pigmentation of Four Lettuce Varieties", Horticultural Science, vol. 50(5), pp. 676-684, 2015.

Raper, et al., "Red Cotton Leaves: Causes and Implications", Aug. 1, 2016, https://www.cottonfarming.com/web-exclusive/red-cotton-leaves-causes-and-implications/, accessed Dec. 4, 2018.

Instruction booklet,"Painting Plants with Light", Veg-A-Sketch, developed by Dr. Kevin Folta and Lauren Plotnik, 2017.

@Veg_A_Sketch, "Cute: A word now used to describe lettuce!" *Twitter*, Feb. 18, 2017.

PCT International Search Report and Written Opinion for PCT/US2017/041032 dated Sep. 18, 2017.

Marx et al., "Investigations on Laser Marking of Plants and Fruits," Biosystems Engineering, vol. 116, pp. 436-446, Dec. 31, 2013.

Japanese Notice of Reasons for Refusal with English translation dated Jan. 17, 2020 for Japanese Patent Application No. 2019-501490 A.

PCT/US2017/041032, Jul. 7, 2017, WO 2018/013412.

* cited by examiner

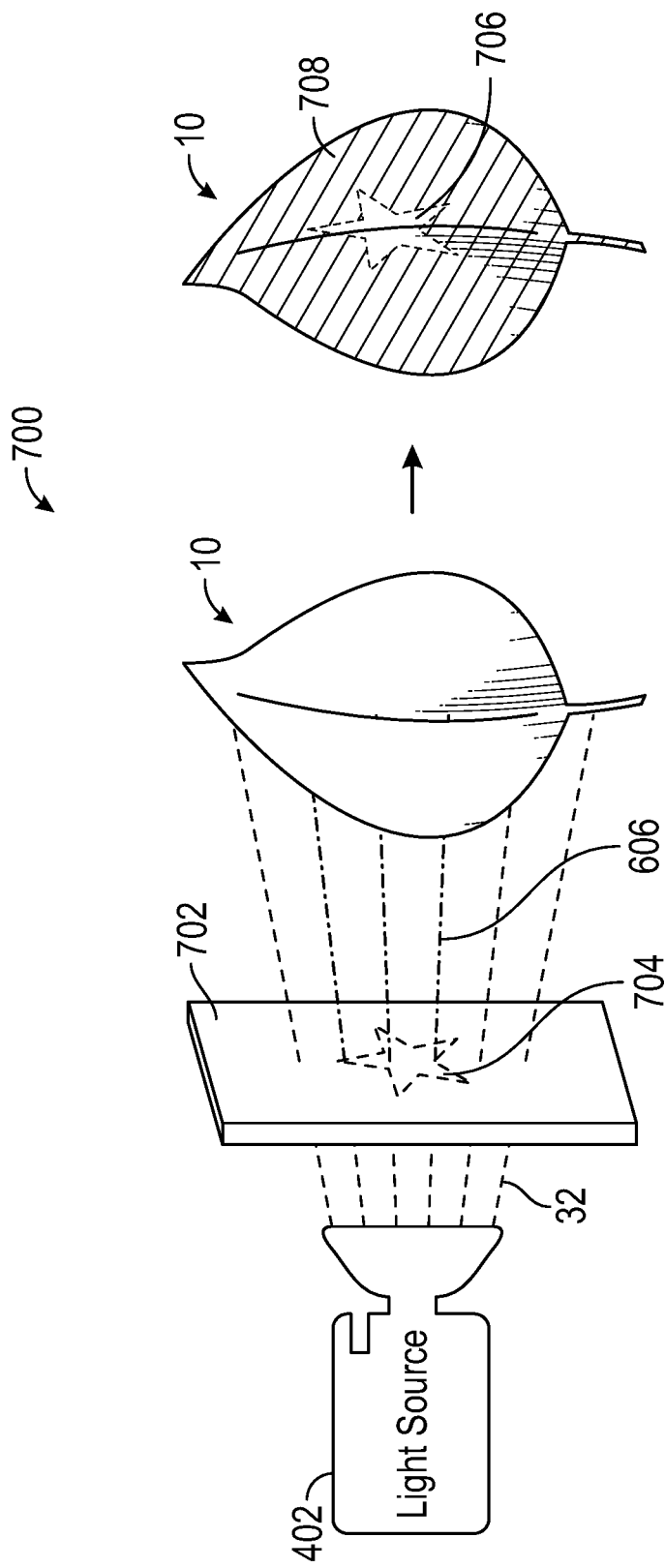

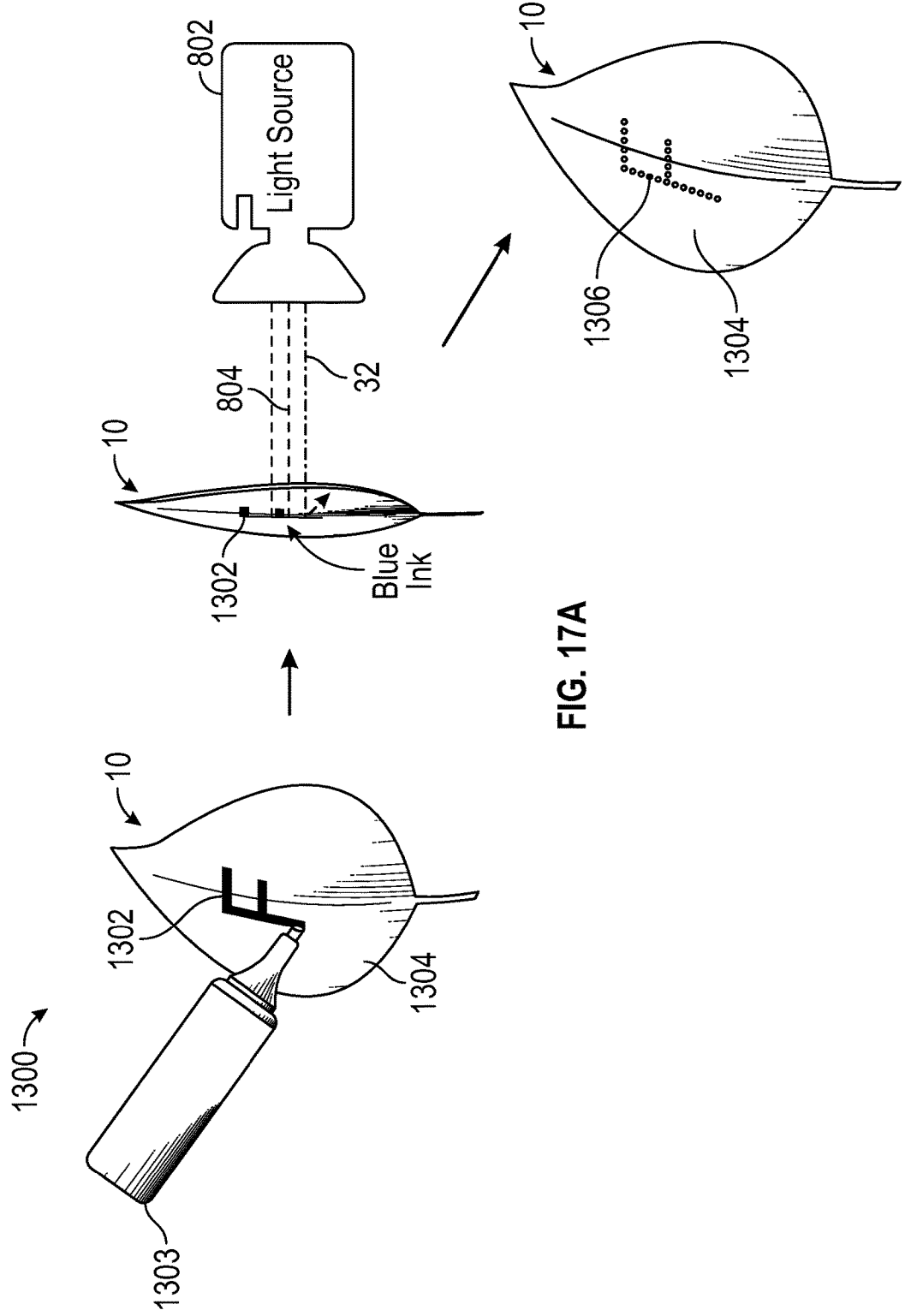

LEAF COLOR PATTERN CREATION

CROSS-REFERENCE TO RELATED APPLICATION

The present application claims priority benefit to a provisional patent application entitled "Leaf Color Pattern Creation," which was filed on Jul. 13, 2016, and assigned Ser. No. 62/361,568. The entire content of the foregoing provisional application is incorporated herein by reference.

BACKGROUND

1. Technical Field

This invention focuses on altering biochrome ratios in plant leaves to display a predetermined pattern or alphanumeric symbol.

2. Background Art

Horticulture scientists have used the spectral precision and tuning capability of LED lights to define ways to change the phenotypes of vegetables using light alone. It has been shown that increased blue photon count during the last days of growing help red varieties of leafy greens have a darker red look. The prior art has failed in controlling the color shift to produce meaningful patterns/images. The present disclosure seeks to overcome the shortcomings/limitations of the prior art.

SUMMARY

An object of this invention is to create patterns on the surface of a leaf by exposing a portion of the leaf to a higher concentration of blue light and the remaining area to a more balanced spectrum of light. The higher concentration of blue light triggers a response in the plant to produce more anthocyanins and the resultant cells have a darker red color. This darker red appearance is brought on by a shift in biochrome ratios with an increase in anthocyanins, a red biochrome.

Experiments internal to AeroFarms (the assignee of the present application) revealed that the pattern of red color was changed when one leaf shadowed another. This leads to red tips on some leaves, and even scalloping patterns where the curved shadow of one leaf on another yields a leaf with a red area where there was no shadow and a green area where the shadow occurred. This has led to developing ways to control how the red pattern emerges on the leaf, including forming geometric patterns and even alphanumeric symbols. These patterns can be made as a "positive" with a red circle formed on a green leaf, or as a "negative" with a green circle in the middle of a leaf that is otherwise turned red.

Some leaves are more conducive to phenotypic changes based on changes in the spectrum of the incident light. Good examples of this include many of the "red" varieties of lettuces and brassicas, including red romaine, red oak, red komatsuna, red Russian kale, and red pac choi. Almost every plant has this type of response at some level, but these are good examples of marketable leafy greens that have a strong response.

A plant can be grown under any of a number of spectra for most of the life of the plant. Typical for the industry are white light (e.g., from the sun, fluorescent tubes, metal halide lights, LEDs, D50 daylight, D65 daylight) or amber light (e.g., from high pressure sodium lamps) or magenta light (e.g., LED lights comprised mainly of red and blue LEDs). The spectrum of light that produces healthy growth and a typical green color is referred to as a "main growth light" spectrum in this discussion.

Researchers (Lopez and others) have shown that once a plant reaches an age where it will have harvestable leaves within a week, a change in spectrum can increase the red color of the leaves. The change in spectrum to one that is strongly blue, typically over 25% by photon count (i.e., 400-480 nm), is key to achieving a "reddening" of the plants. This spectrum is referred to as an "altering spectrum" in this discussion.

When a plant is illuminated by a variety of different wavelengths of light at once across the geography of the blade, then cell by cell changes can occur. For example, cells where a higher concentration of blue light occurs may produce more anthocyanin and have a redder color. Cells that have a more balanced spectrum may continue to have a green hue.

Careful control over the optical distribution of the altering spectrum can allow complex patterns of cells with altered biochromes to develop in the leaf. These complex patterns can be in the form of geometric shapes, alphanumeric characters or even trademarked figures.

This effect is best achieved by lighting plants while still growing. Achieving this requires having easy access to plants to make the lighting change on the blade. Growing in an aeroponic system is especially helpful to achieve these results because of the easy access to every plant at every point of its life. Hydroponic growth methods prevent access to plants in the middle stage of life, and only allow access at the planting and harvesting stages. This is related to the Styrofoam "boats" typically used in deep pond hydroponics being far from the walkways when they are in the middle of their ponds. Vertical farm systems are also beneficial in achieving the desired result because the close control over the lighting used and the typical short distance between lights and the plants means easier optical control.

The shift in color from green to red can be measured by the color coordinates of the light reflected from the leaf when a standard light source is used. The units used to define the color are ccx, ccy and ccz. These three add up to 1, so typically ccx and ccy are used alone to define the color. Ccx is mostly a measurement of the red content, ccy is mostly a measurement of the green content and ccz is mostly a measurement of the blue red content. Using those metrics a shift in reflected color that has the ccx component increase by 0.002 would signal a shift to a redder cell color.

Other objects and advantages will become apparent from the following description and drawings.

BRIEF DESCRIPTION OF THE DRAWINGS

A more complete understanding of the present disclosure and advantages thereof may be acquired by referring to the following description in consideration with the accompanying drawings, in which like reference numbers indicate like features.

FIG. 10A depicts a leaf exposed to light through a panel with phosphor, according to the present disclosure.

FIG. 10B depicts a leaf with an uncolored pattern and with the remaining surface area colored, according to the present disclosure.

FIG. 17A depicts a leaf exposed to light and with an ink design that changes the color of the leaf under the ink, according to the present disclosure.

FIG. 17B depicts a leaf with a design colored on a surface according to the present disclosure.

DETAILED DESCRIPTION OF THE DRAWINGS

Figure 1:
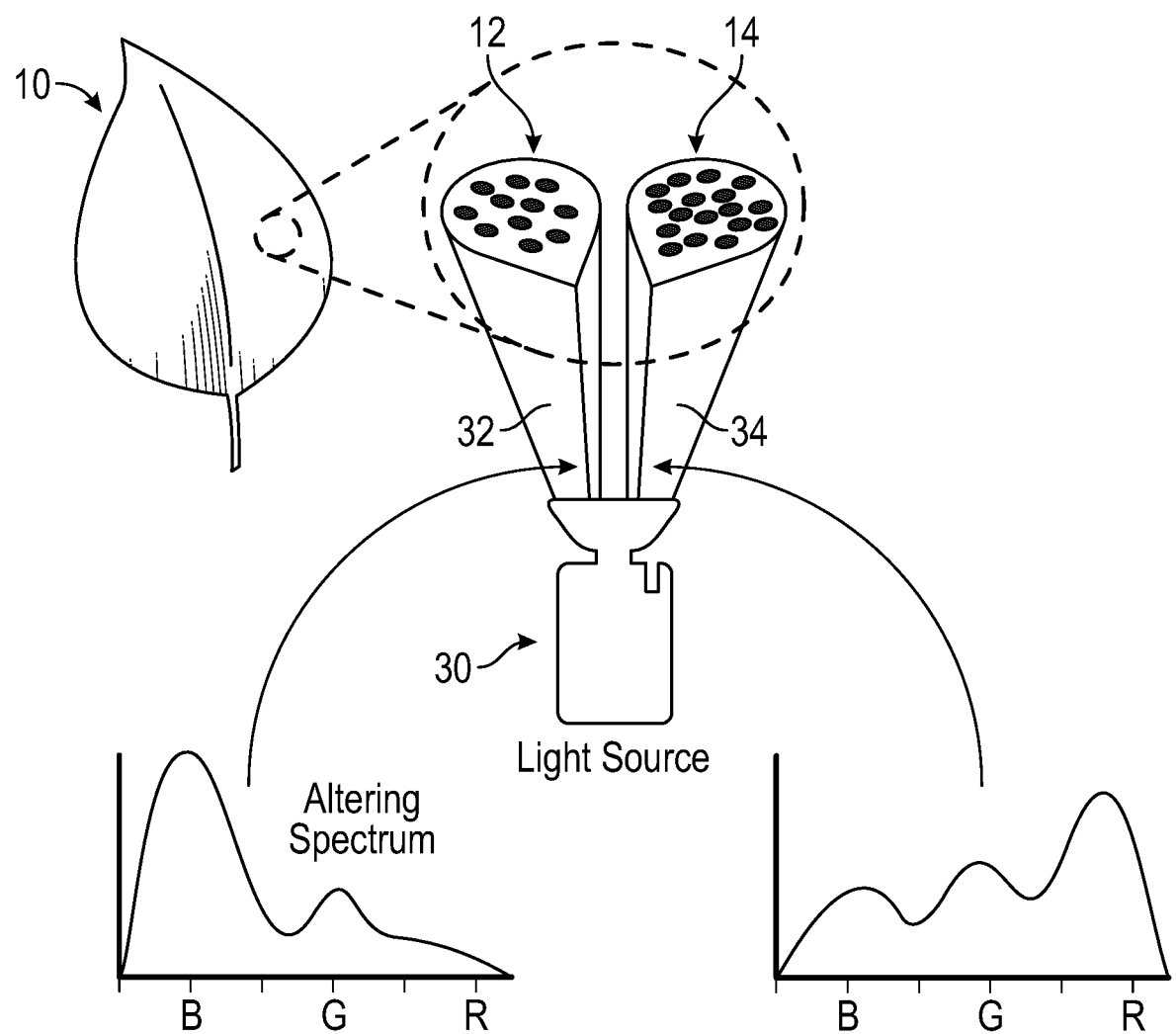
FIG. 1 depicts an isolated portion of a leaf exposed to various light rays, according to the present disclosure.

As referenced above, FIG. 1 depicts leaf 10 exposed to altering spectrum 32 and main growth light 34 from light source 30. Once leaf 10 has reached a viable growth, according to a spectrum typical of agriculture, usually during the remaining week before harvesting, leaf 10 is more susceptible to phenotypical changes that can be expressed by altering the spectrum of incident light. Specifically, the pigment ratios can be altered by supplying altering spectrum 32.

Altering spectrum 32 is comprised of mostly blue light, illustrated by the bar graph on the left, wherein the blue light 32 produces the pigment changes to leaf 10 on a group of plant cells 12. The individual circles of group of plant cells 12 are the individual plant cells, enlarged for clarity, and in this figure, group of plant cells 12 are green. Main growth light 34 is comprised of mostly red light, illustrated by the bar graph on the right, wherein the main growth light 34 provides the further growth required by leaf 10 on a group of plant cells 14. Similar to group of plant cells 12, the individual circles of group of plant cells 14 are the individual plant cells, enlarged for clarity, and in this figure, group of plant cells 14 are green. Main growth light 34 can also be white light, amber light, magenta light or other types of lights that produce healthy growth and the typical leafy green color, as is apparent to persons skilled in the art. The terms "altering spectrum" and "blue light" are synonymous and can be interchanged without changing the scope of this disclosure.

Figure 2:
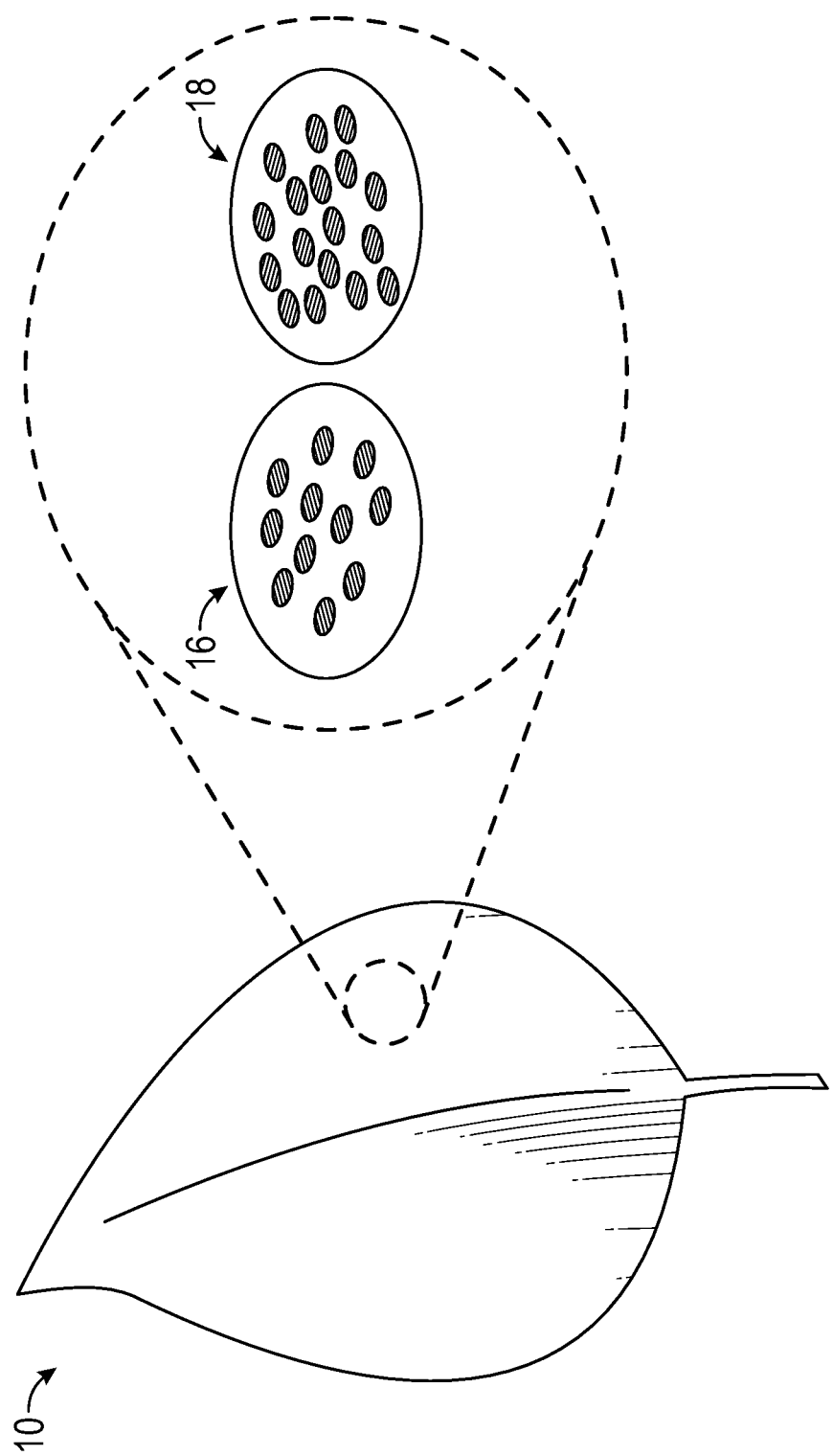
FIG. 2 depicts an isolated portion of a leaf after being exposed to various light rays, according to the present disclosure.

With reference to FIG. 2 in view of FIG. 1, group of plant cells 16, previously referenced as group of plant cells 12, which were preferentially illuminated by altering spectrum light 32 produced a different ratio of pigments that shifted their reflected color towards red or purple, as depicted by group of plant cells 16. Meanwhile, group of plant cells 18, maintained a green color, as was previously referenced with group of plant cells 14, despite exposure to main growth light 34. When a plant is illuminated by a variety of different wavelengths of light at once across the geography of the blade, cell by cell changes can occur. For example, cells where a higher concentration of blue light 32 occurs may produce more anthocyanin and have a redder color. Cells that have a more balanced spectrum, i.e., main growth light 34, may continue to have a green hue.

Figure 3C:
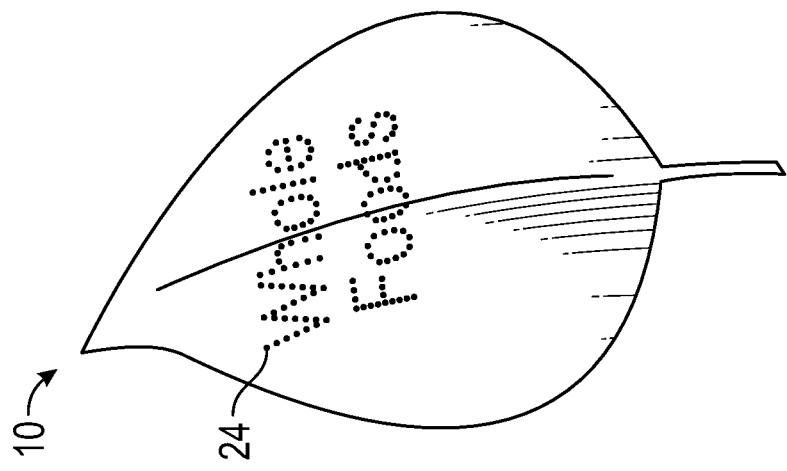
FIG. 3C depicts a leaf with letters colored on a surface, according to the present disclosure.
Figure 3B:
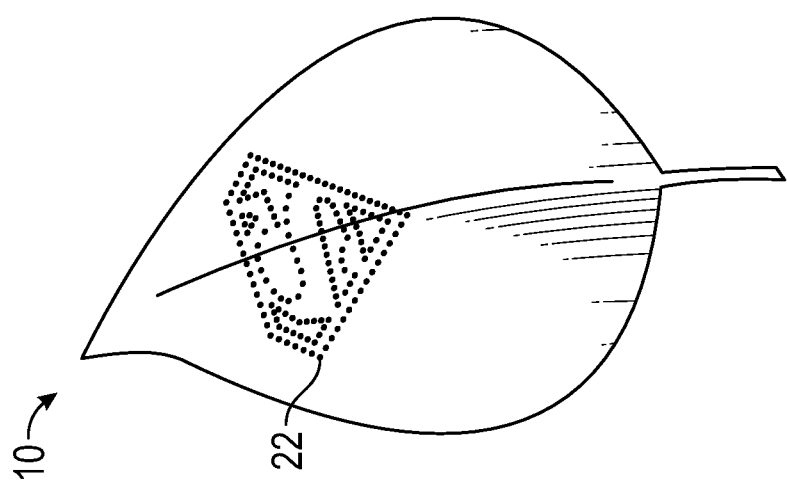
FIG. 3B depicts a leaf with an image colored on a surface, according to the present disclosure.
Figure 3A:
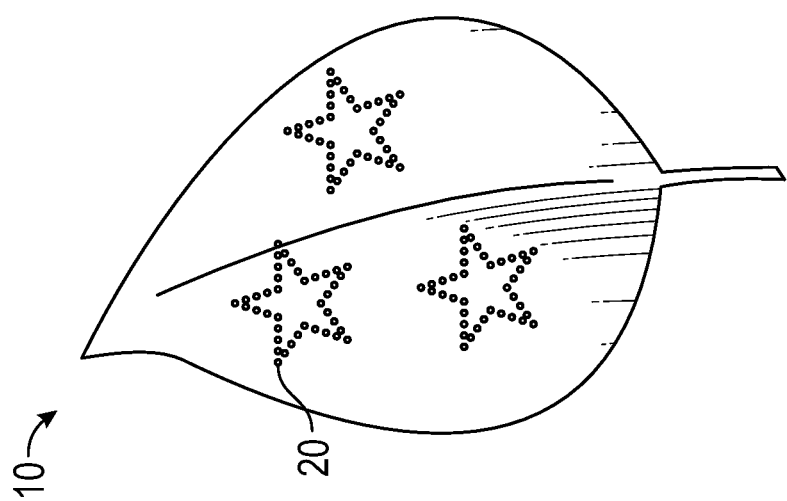
FIG. 3A depicts a leaf with a pattern colored on a surface, according to the present disclosure.

With reference to FIGS. 3A-3C, by choosing groups of cells matching a recognizable pattern, leaf 10 can deliver a message to the viewer. Careful control over the optical distribution of the altering spectrum 32 can allow complex patterns of cells with altered biochromes to develop in leaf 10. Classes of biochromes include, but are not limited to flavonoids, carotenoids and terpenoids. These complex patterns can be in the form of geometric shapes 20, alphanumeric characters 24 or even trademarked FIG. 22. As was previously mentioned, this effect is best achieved by lighting plants while still growing. The ability to alter cells to create a recognizable pattern can have tremendous value to the acceptability of leafy green food. For example, the food industry has shown repeatedly that by placing a cartoon character's image on food or food packaging will increase that foods consumption by children. By placing a cartoon character or another recognizable image onto the leaf, children may be more apt to eat leafy green foods. This is only one example of the various applications for altering biochromes in the leaf.

Figure 4A:
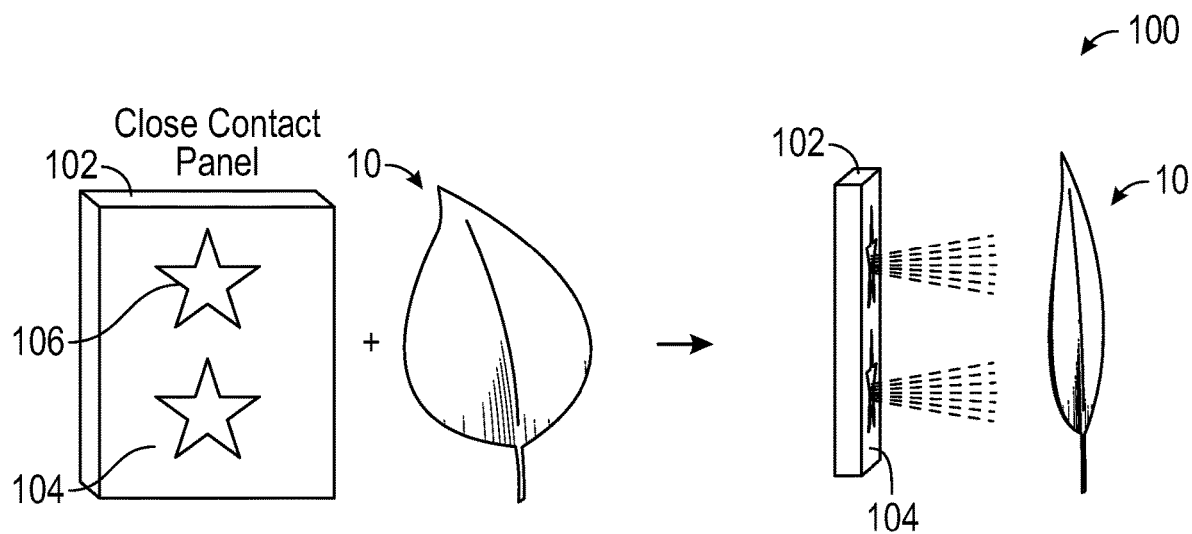
FIG. 4A depicts a light panel interfacing with a leaf to form a color pattern, according to the present disclosure.
Figure 4B:
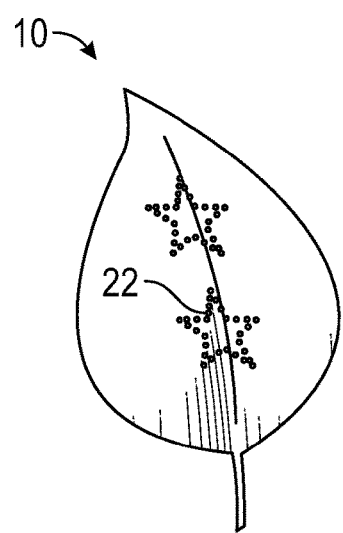
FIG. 4B depicts a leaf with a pattern colored on a surface, according to the present disclosure.

With reference to FIG. 4A, in one embodiment, a method of forming pattern 22 is shown by utilizing panel 102 (i.e. a light source), in this case an LED display panel, which displays white light 104 in most places, but emits an altering spectrum, shown as blue stars 106, in two places. Leaf 10 is brought into close contact with panel 102, thereby creating assembly 100. In another embodiment, leaf 10 may be in direct contact with panel 102. Leaf 10 can be physically constrained against panel 102 with traditional means of attachment (i.e., tape, an opaque fabric, glue, backplate). The white light encourages continued growth for the entire leaf and the blue areas encourage an increase in contrasting cell colors in the areas illuminated by them. As depicted by FIG. 4B, the resultant leaf 10 has areas of increased red biochrome, for example the red star pattern 22, expressed in the cells of leaf 10. In this embodiment, the remaining surface of leaf 10, not exposed to blue light, is green. The stars 22 illustrated in FIGS. 4A and 4B are one of the many various patterns that can be created on leaves.

In another embodiment, panel 102 does not include white light 104 and only stars 106 emit light (i.e., blue light). The altering of the biochromes in leaf 10 is achieved with or without white light 104 being present. As was mentioned before, white light 104 helps the overall leaf 10 continue to grow while the biochrome shift is occurring in the targeted cells. In another embodiment, the images emitted in the altering spectrum move over time as leaf 10 grows and the cells targeted for biochrome modification move along with it. This helps prevent a "streaking" effect or a "smearing" effect of the biochrome on the leaf, thereby ensuring the pattern on the leaf is well defined and for alphanumeric symbols, legible. To ensure the images emitted by the altering spectrum track the growth of the leaf, sensors built into the panel can provide the necessary feedback to populate and maintain growth models. The growth models can be referenced and the images on the panel can be adjusted either with or without human interaction (i.e., manually or automatically).

Figure 5:
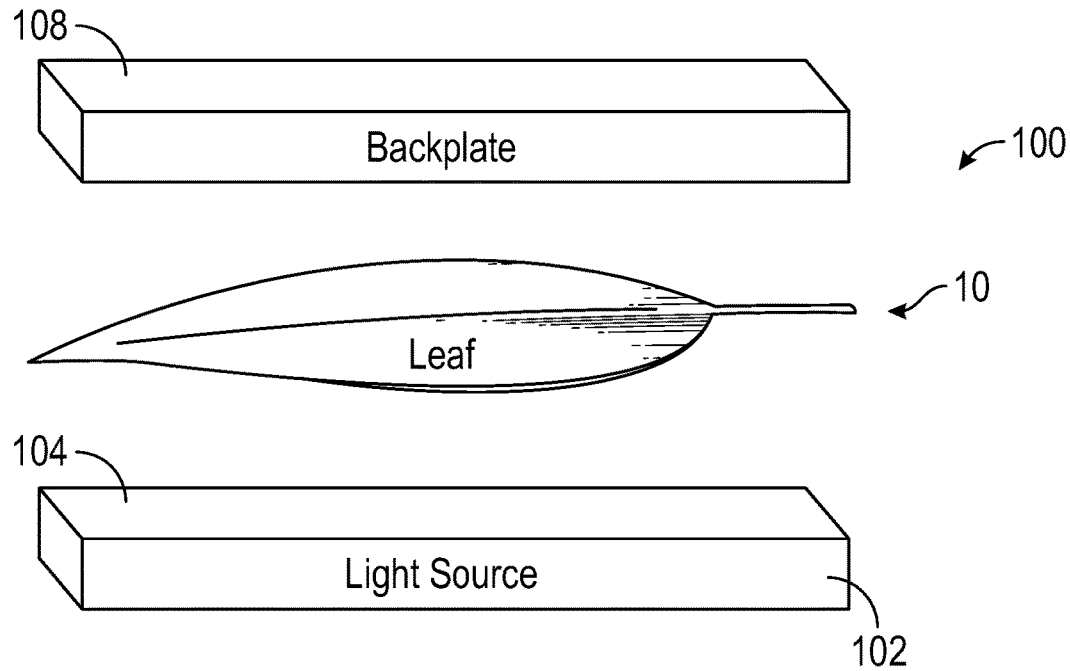
FIG. 5 is a side view of a leaf sandwiched between a light panel and a backplate, according to the present disclosure.

With reference to FIG. 5, in view of the techniques depicted in FIG. 4A, backplate 108 can hold leaf 10 in close contact with panel 104 (i.e. light source) to create another embodiment of assembly 100. In addition to providing a weight against leaf 10, backplate 108 can provide additional functionality, including, but not limited to, emitting or reflecting light and acting as a heatsink. Backplate 108 can be transparent to let light in from the other side of leaf 10. Backplate 108 can also be a light source or a light conversion device, utilizing phosphor. Backplate 108 can act as a heatsink to keep leaf 10 at the desired temperature and prevent overheating caused by the light source or other heat sources. The desired temperature can vary depending on the type of plant, agricultural specifications for those plants should be referenced. Backplate 108 can include additional heat reducing technologies, including but not limited to, a fan and liquid cooling. In other embodiments, backplate 108 can provide additional heat to leaf 10 to ensure the plant is in accordance with agricultural specifications. In another embodiment, backplate 108 can include a pattern and a means of emitting an altering spectrum to alter the biochromes of leaf 10 resembling said pattern. The altering of biochromes of leaf 10 can occur on both surfaces of leaf 10, via light source 102 and backplate 108.

Figure 6:
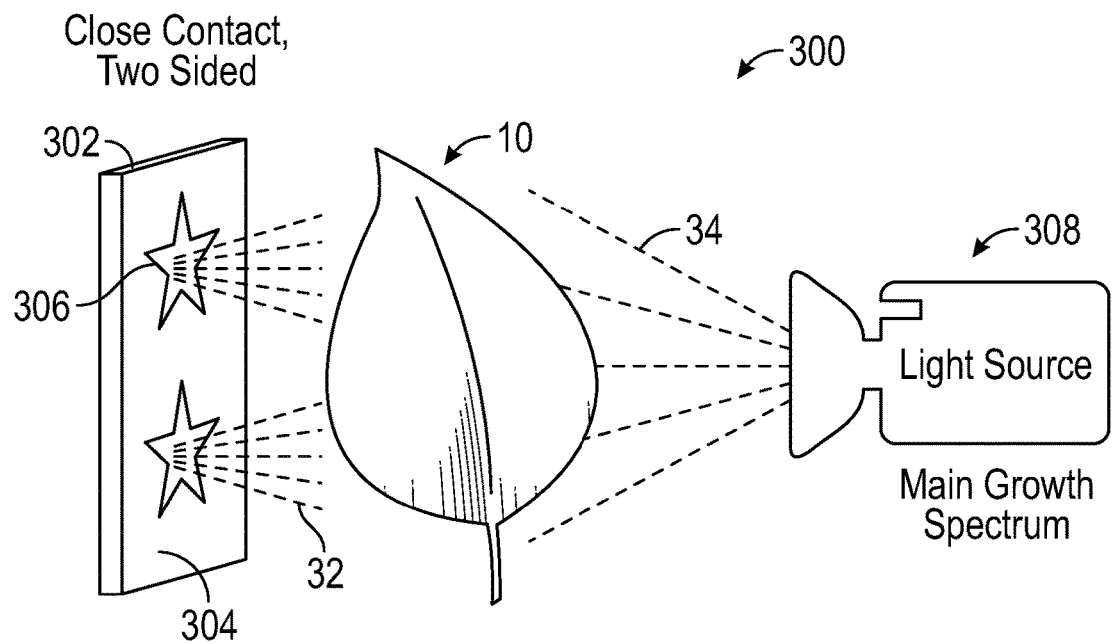
FIG. 6 depicts a leaf exposed to light from both sides according to the present disclosure.

With reference to FIG. 6, leaf 10 can be lit from both sides with altering spectrum light 32 emanating from panel 302 and main growth spectrum light 34 emanating from light source 308. Panel 302 includes a pattern 306, in this embodiment the pattern is a pair of stars, which emit altering spectrum light 32 on leaf 10. Surface 304 in some embodiments can emit white light, in other embodiments can emit no light, as is the case in this embodiment. However, in other embodiments, pattern 306 can emit no light or white light and conversely, surface 304 emits altering spectrum light 32, thereby altering the biochromes of leaf 10 surrounding pattern 306. In another embodiment, panel 302 could be selectively reflective to only reflect altering spectrum light 32 and only in the region where pigment change is desired.

Figure 7:
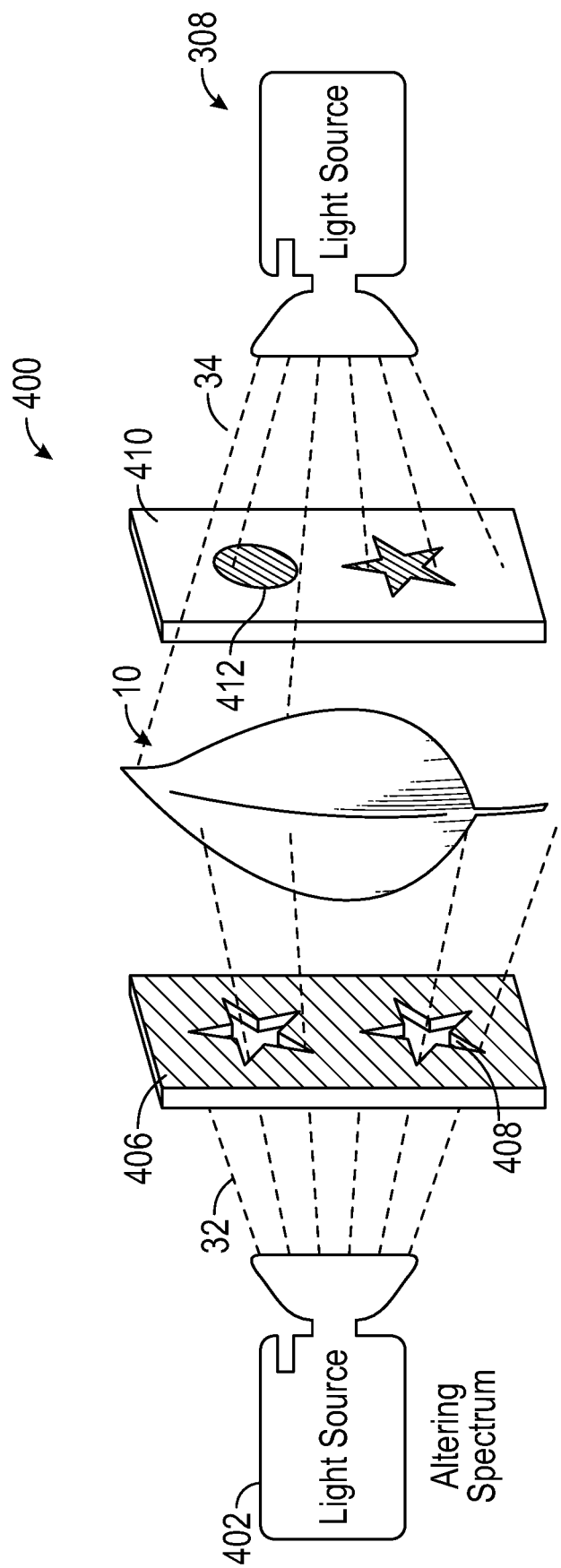
FIG. 7 depicts a leaf exposed to light from both sides according to the present disclosure.

With reference to FIG. 7 and in further view of FIG. 6, assembly 400 includes leaf 10 which can be lit from both sides to help increase the contrasting colors between the cells receiving altering spectrum light 32 and those receiving main growth light 34. In one embodiment, leaf 10 is surrounded by two "masks," wherein positive mask 406 is substantially opaque and negative mask 410 is substantially transparent. The material of the masks can be, but is not limited to, paper, plastic, or an LCD display, other materials will be apparent to persons skilled in the art. The positive and negative masks do not have to be made of the same material. Further, pattern 408 is cut into positive mask 406 so as to only allow light to pass through the cutout area, thereby creating the "positive" feature. Light source 402 emits altering spectrum light 32, which is directed at positive mask 406. Positive mask 406 restricts light from reaching leaf 10 in all areas other than the cutout pattern 408, thereby encouraging red biochrome production.

In the alternative, light source 308 emits main growth light 34, which is directed at negative mask 410. Negative mask 410 enables all light to reach leaf 10 and blocks light in the area where the pattern is going 412. The positive/negative mask has the effect of increasing the relative amount of altering spectrum light 32 (i.e. blue light) striking the cells, and can increase production of certain biochromes to achieve the desired biochrome ratio and color quicker. In one embodiment, leaf 10 receives a substantial amount of main growth light 34; for instance, leaf 10 can receive over 250 micromoles/sqm/s of main growth light 34, however, leaf 10 can receive less than 250 micromoles/sqm/s, as will be apparent to persons skilled in the art. In another embodiment, negative mask 410 is removed and only positive mask 406 is used. Using only positive mask 406 can still yield good results.

Figure 8:
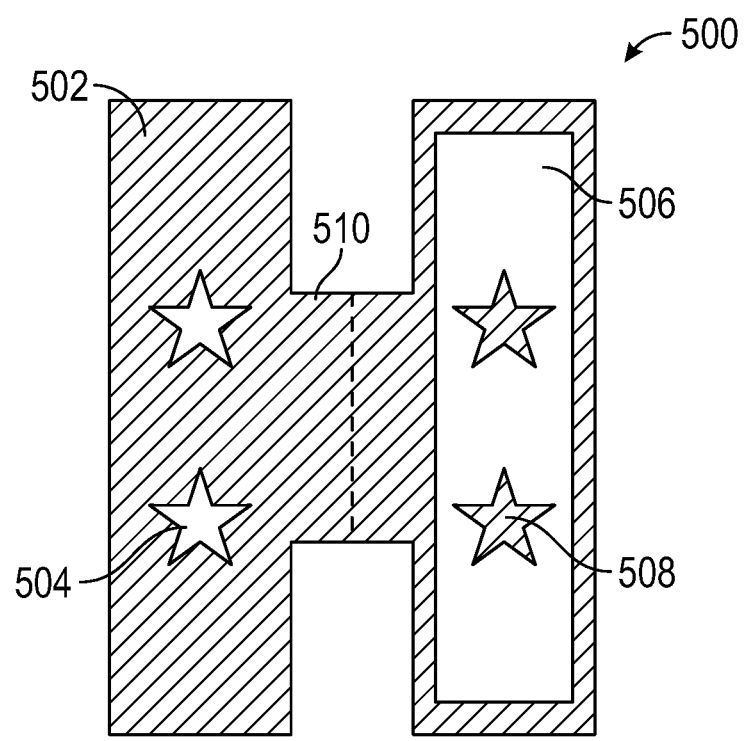
FIG. 8 depicts a mask pocket that surrounds a leaf to define a pattern, according to the present disclosure.

With reference to FIG. 8 in view of FIG. 7, device 500 provides a more repeatable method for focusing altering spectrum light onto a pattern 504 and blocking main growth spectrum light from the opposing pattern 508. Similar to the positive/negative masks discussed above, device 500 includes a "positive" side 502 and a "negative" side 506. Both sides are connected and fold line 510 enables a user to create an envelope and surround the leaf. The material of device 500 can be, but is not limited to, paper or plastic, other materials will be apparent to persons skilled in the art. Much like the positive mask, positive side 502 only allows light to pass through pattern 504. Conversely, negative side 506 only blocks light from passing through pattern 508. The positive/negative sides are interchangeable with either type of light source.

In one embodiment, positive side 502 can be in-between the altering spectrum light and the leaf, wherein the blue light will only influence the leaf through pattern 504. In this embodiment, the negative side 506, opposing the positive side, would be in-between the main growth light and the leaf, wherein the leaf will not receive the main growth light through pattern 508. As a result, the portion of the leaf exposed to the blue light (i.e. pattern 504) would have a reddish tint versus the remaining portion of the leaf which would be green.

In another embodiment, positive side 502 can be in-between the main growth light and the leaf, wherein the main growth light will only influence the leaf through pattern 504. In this embodiment, the negative side 506, opposing the positive side, would be in-between the altering spectrum light and the leaf, wherein the leaf will receive the blue light in all areas except pattern 508. As a result, the entire leaf would have a reddish tint, except the portion of the leaf exposed to the main growth light (i.e. pattern 504).

Figures 9A, 9B:
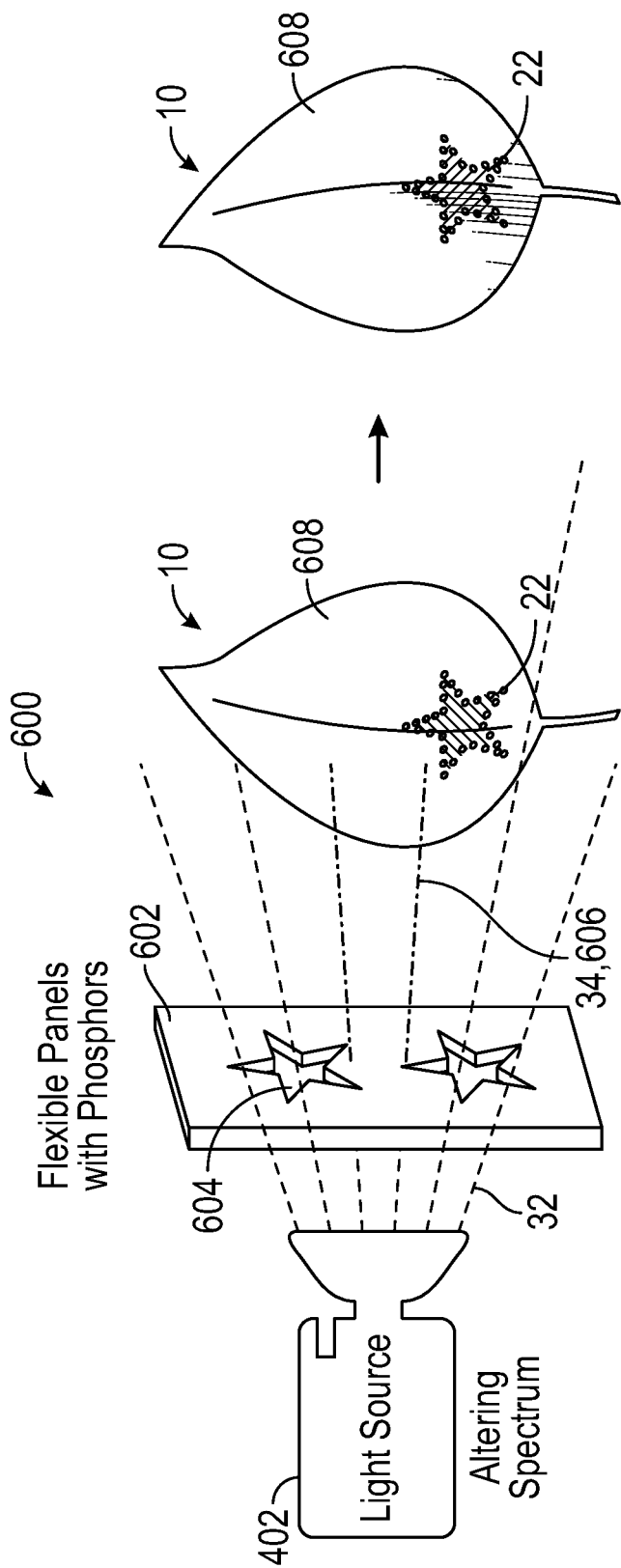
FIG. 9A depicts a leaf exposed to light through a panel with phosphor, according to the present disclosure.
FIG. 9B depicts a leaf with a pattern colored on a surface, according to the present disclosure.

With reference to FIG. 9A, assembly 600 includes light source 402, which emits altering spectrum light 32. Between light source 402 and leaf 10 is panel 602, which has phosphor embedded in it. The phosphor can be deposited on panel 602 by placing an adhesive backed film onto a pattern of phosphor, by applying a phosphorous paint, or via other methods as will be apparent to persons skilled in the art. Panel 602 can be made of plastic, however, other materials can be utilized that will not affect the performance of panel 602. In one embodiment, altering spectrum light source 402 is the only light source used. A spectrum shifting means is employed, typically a phosphor to geometrically selectively shift some of altering spectrum 32 to a different color, resulting in a more balanced color. Further, panel 602 contains phosphors that shift blue light 32 to yellow and red light 606 so as to shift the light to a spectrum elsewhere within the photosynthetically active region (i.e. 400-700 nm). Patterns 604 are cut into panel 602 to allow blue source light 32 to shine through in some areas. In areas without holes, blue light 32 interacts with the phosphor to end up emitting a balanced spectrum that contains blue, yellow and red light 606 and has a generally white hue.

Leaf 10 is held in close proximity to panel 602, the substantially white light 606 encourages green cell pigmentation, the cells that are illuminated by altering spectrum 32 that passes through pattern 604 end up with a red coloring. Displayed in FIG. 9B, a reddish pattern 22 is created as a result of blue light 32 passing through pattern 604. The remaining surface 608 of leaf 10 is green as a result of the phosphor converting blue light 32 into a growth providing light 606.

This embodiment is enabled by the fact that altering spectrum light 32 is of a higher energy level than the other photons making up a balanced horticulture spectrum. The blue photons are able to down convert to yellow and red photons without losing much efficiency in the photon count produced. The drop in irradiated power can actually be a benefit to the plant as the heat from the Stokes shift loss is captured in the plastic panel instead of being absorbed in the plant and locally heating the leaf.

With reference to FIG. 10A, assembly 700 includes film 702, which is attached to leaf 10 via an adhesive (i.e. a sticker), or other attachment means, wherein film 702 locally changes the spectrum of light from altering spectrum 32 to main growth spectrum 606. In this embodiment, plastic film 702 has a section of it that contains phosphor, and the phosphor is defining a desired pattern 704. The material of film 702 is not limited to plastic, however, other materials will be apparent to persons skilled in the art. The phosphor could have been embedded in a separate plastic at first, cut out and attached to plastic film 702. It could also have been painted or printed onto plastic film 702. Similar to FIG. 9A, as altering spectrum 32 is mixed with phosphor pattern 704, the color emitted is a combination of yellow, green, and/or red. In one embodiment, the color emitted can be magenta; magenta is comprised of 5-25% of the light within the photosynthetically active region (PAR) which is blue light and substantially all of the remainder within the PAR is red light. Further, as displayed in FIG. 10B, the majority of surface 708 of leaf 10, exposed to altering spectrum light 32, is reddish, meanwhile, pattern 706, as a result of the conversion to main growth spectrum light 606, is green.

Figure 11A:
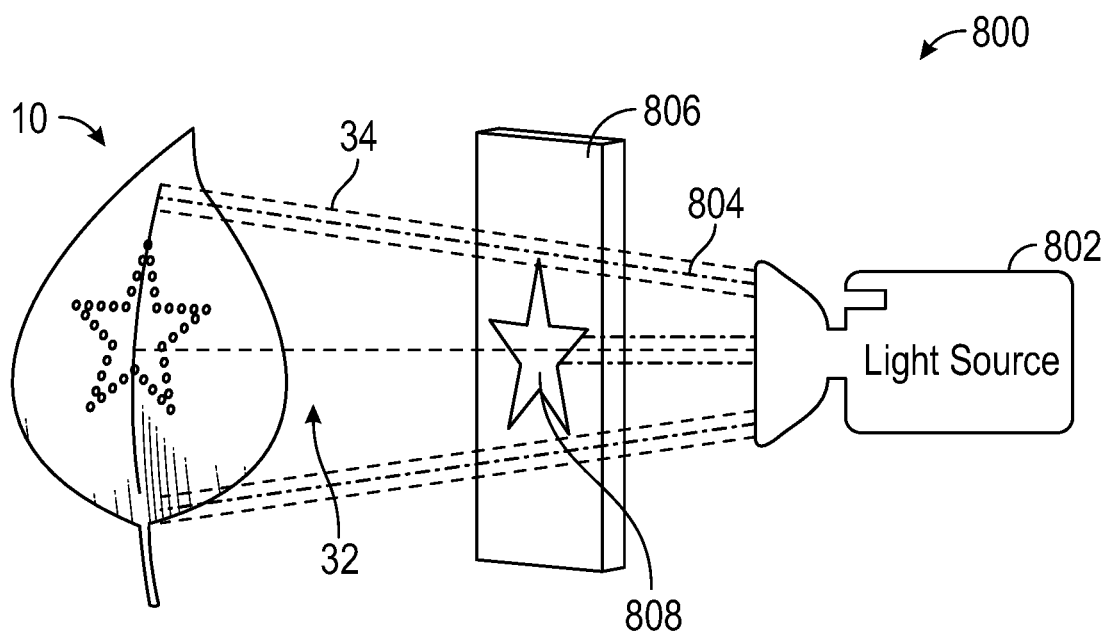
FIG. 11A depicts a leaf exposed to light through a filter according to the present disclosure.
Figure 11B:
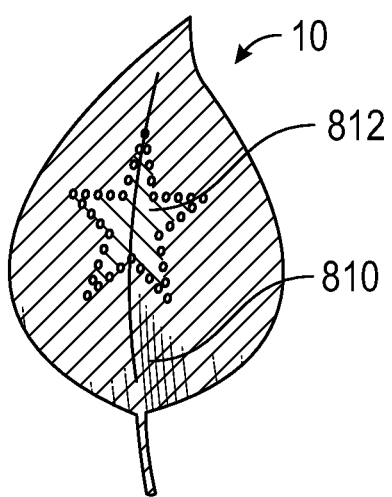
FIG. 11B depicts a leaf with an uncolored pattern and with the remaining surface area colored, according to the present disclosure.

With reference to FIG. 11A, assembly 800 includes light source 802, which produces main growth spectrum light 804, which interfaces with filter 806. Filter 806 is placed between light source 802 and leaf 10 and selectively removes light outside the altering spectrum (i.e. typically red and green light). Filter 806 can be, but is not limited to, an absorbing gel, a high performance thin film or a modified hot-mirror. A hot-mirror can be comprised of a stack of thin film coatings with a cutoff in the range of 450-600 nm. The thin film coatings can be metallic oxides. In this embodiment, filter 806 converts main growth light 802 to altering spectrum light 32 in the surfaces surrounding pattern 808. As is displayed in FIG. 11B, surface 810 surrounding pattern 812 on leaf 10 is reddish and pattern 812 remains green.

In another embodiment, the light pass-through roles can be reversed, wherein the surface of filter 802 can allow all main growth light 802 to pass and the light passing through pattern 808 will be filtered to allow only altering spectrum light 32. As a result, the surface surrounding the pattern on the leaf would be green and the pattern would be a reddish tint.

Figure 12:
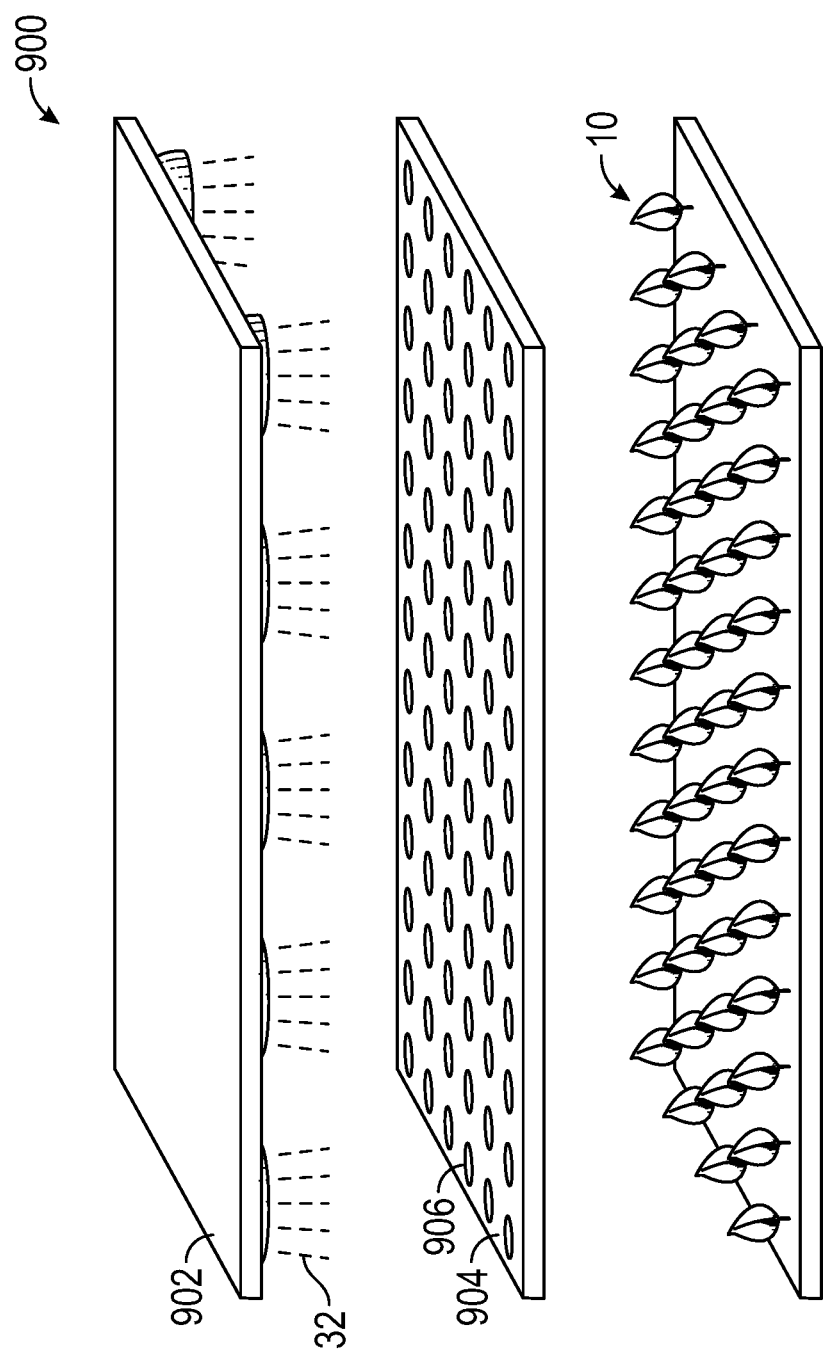
FIG. 12 depicts a plurality of plants exposed to light through a patterned panel, according to the present disclosure.

With reference to FIG. 12, assembly 900 includes light source 902, which emits light through panel 904 and onto a plurality of plants 10. In this embodiment, light source 902 emits altering spectrum light 32, which passes through panel 904 with many patterns 906 cut into it. In another embodiment, light source 902 can emit a main growth spectrum light and panel 904 can filter the altering spectrum light to create patterns, as described above. Although depicted as circles, pattern 906 can be of any shape (i.e., polygons or alphanumeric shapes). Panel 904 is situated over many plants 10 and the result is a projection of many ovoid spots of light onto the group of plants 10 below. These spots are sometimes fully contained on a single leaf and sometimes part on one leaf and part on another. The shape of the ovoid will be dependent on the angle of the leaf blade with respect to the ray of light 32 passing through the holes 906 in panel 904. Panel 906 can be held in close proximity to the top of the plant canopy 10 to improve the sharpness of the shape incident on plant 10 and increase the color contrast between the cells with altered biochrome and those without. In this embodiment, panel 904 is substantially opaque to altering spectrum light 32, except for the plurality of pattern windows 906.

Figure 13:
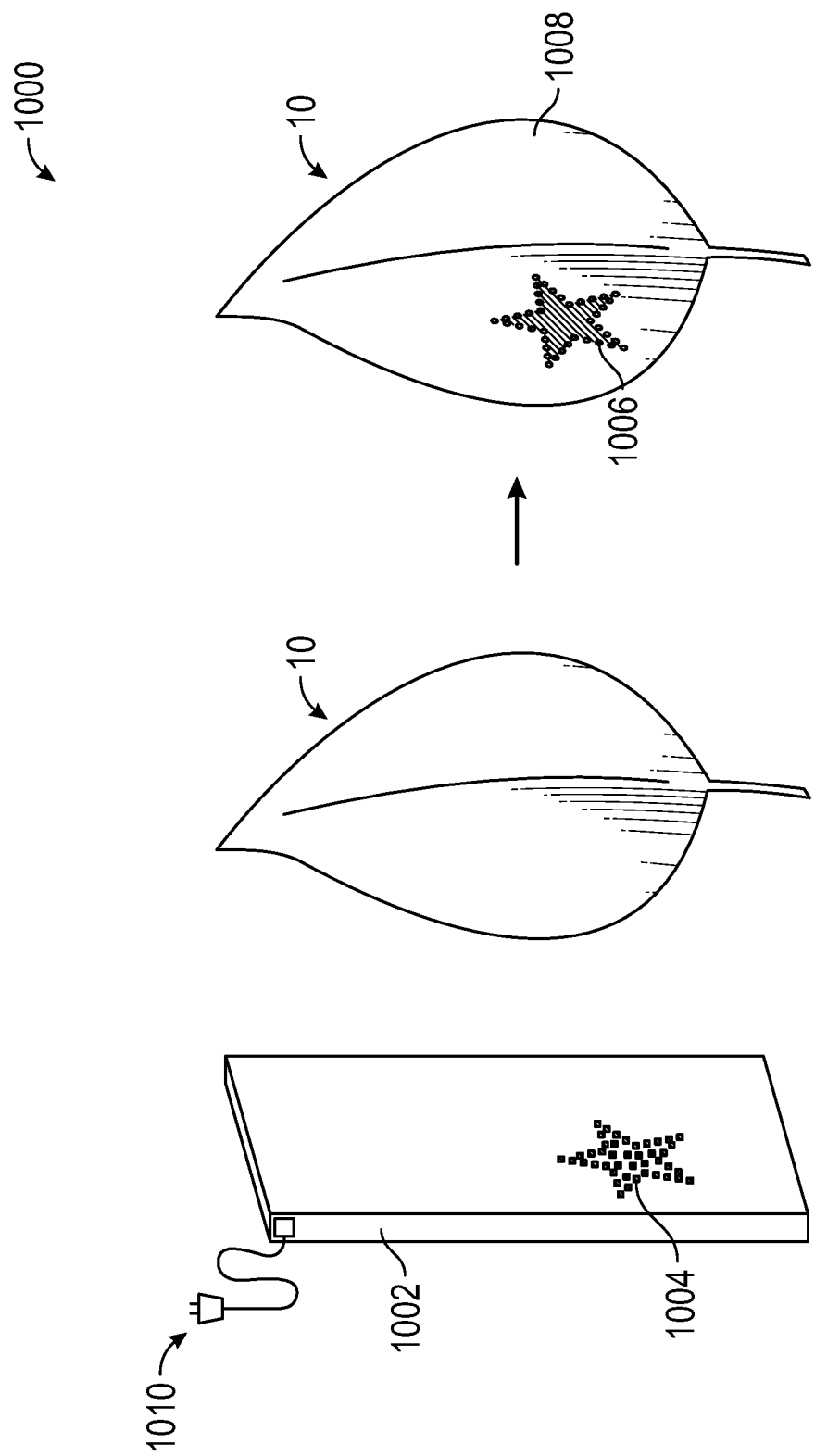
FIG. 13 depicts a leaf exposed to a plurality of LEDs, arranged in a pattern, and the light altered leaf, according to the present disclosure.

With reference to FIG. 13, assembly 1000 includes light source 1002, comprising of a plurality of LEDs 1004 arranged in a pattern and the necessary electronics 1010 needed to route power to panel 1002. In one embodiment, electronics 1010 can be a flexible circuit made of kapton with silver traces leading to a group of LEDs 1004. LEDs 1004 are arranged in a pattern generally matching the desired pattern wanted on plant 10. Light source 1002 can be held in close proximity to leaf 10 and illuminates the group of cells where biochrome change is desired. In the embodiment depicted, light source 1002 emits altering spectrum light and is sized to match the size of one leaf 10. In another embodiment, light source 1002 can be comprised of a plurality of LEDs 1004 that emit main growth light. In another embodiment, light source 1002 can be larger than one leaf 10 and create a pattern that is depicted on a plurality of leaves.

With further reference to FIG. 13, when leaf 10 is exposed to the altering spectrum light from LEDs 1004, the cells of leaf 10 in contact with LEDs 1004 are altered and develop a reddish tint resembling the LED pattern 1006. The remaining surface area 1008 of leaf 10 is unaltered and maintains a greenish color. In another embodiment, LEDs 1004 can be arranged around a desired pattern so that when leaf 10 is exposed to light source 1002, the unaltered greenish area on leaf 10 is the desired pattern and the remaining surface area has a reddish tint. In another embodiment, light source 1002 can include multiple LED patterns so as to alter multiple leaves at the same time.

Figure 14:
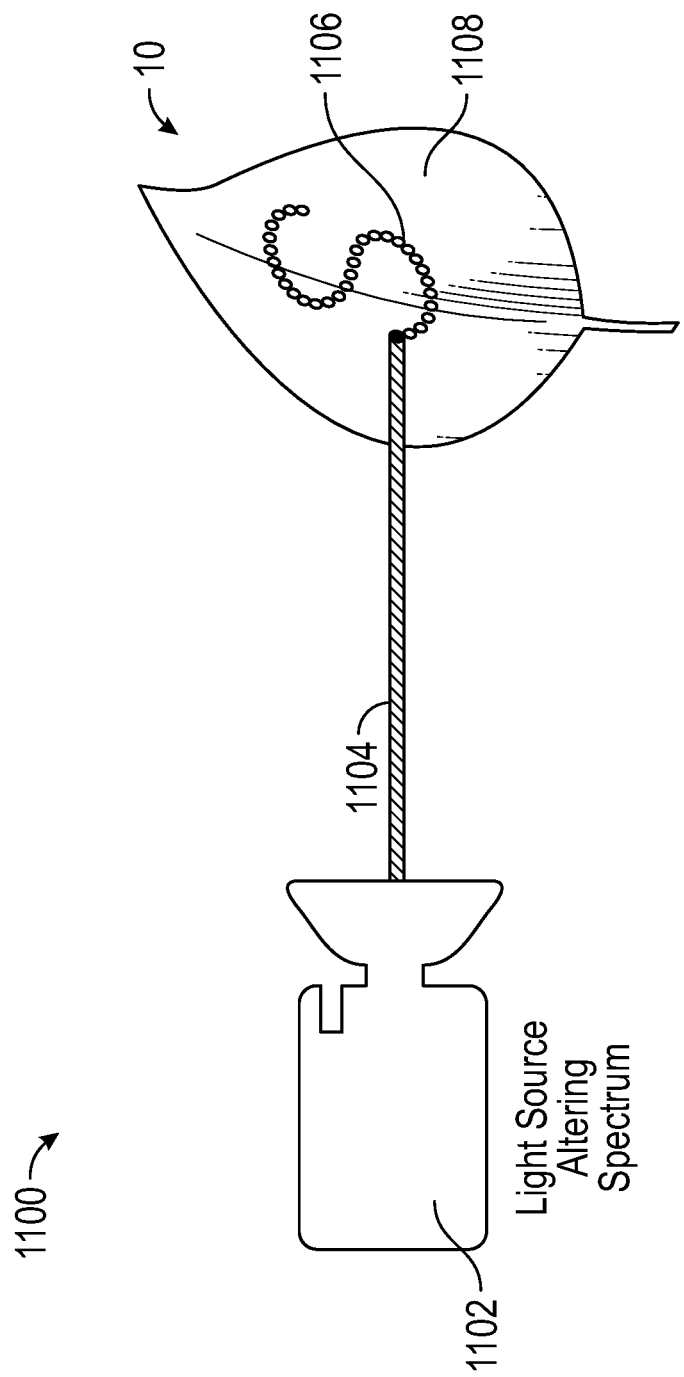
FIG. 14 depicts a leaf exposed to a laser according to the present disclosure.

With reference to FIG. 14, assembly 1100 includes light source 1102, which directs a blue laser beam 1104 onto leaf 10. Blue lasers are most well aligned with the altering spectrum thus far, however, additional lasers can be used as will be apparent to persons skilled in the art. The blue lasers would give an altering spectrum that is monochromatic, which can further increase the ratio of red to blue biochromes in the cells affected. Light source 1102 and subsequently blue laser 1104 can be directed using optical steering and diffraction plates typical of laser optics. In another embodiment, the pattern can be created on a computer program and referenced by laser 1102 to create the pattern on leaf 10.

In a preferred embodiment, laser 1102 traces a shape along the surfaces of leaf 10. As it travels along leaf 10, it leaves behind cells that have received a tremendous amount of blue light and which are then producing a large amount of red biochrome. Laser 1102 can retrace this path again and again to get the required dose of blue light into the cells and achieve the color change desired. As a result, leaf 10 includes a reddish pattern 1106, in the shaped desired by the user, and the remaining surface 1108 is unaltered and greenish in color. In another embodiment, a feedback loop can be set up where an imaging system senses regions (or even individual cells) where those cells have yet to achieve the desired color. In doing so, laser 1102 can target them with additional doses of blue photons 1104 until the desired result is achieved.

Figure 15:
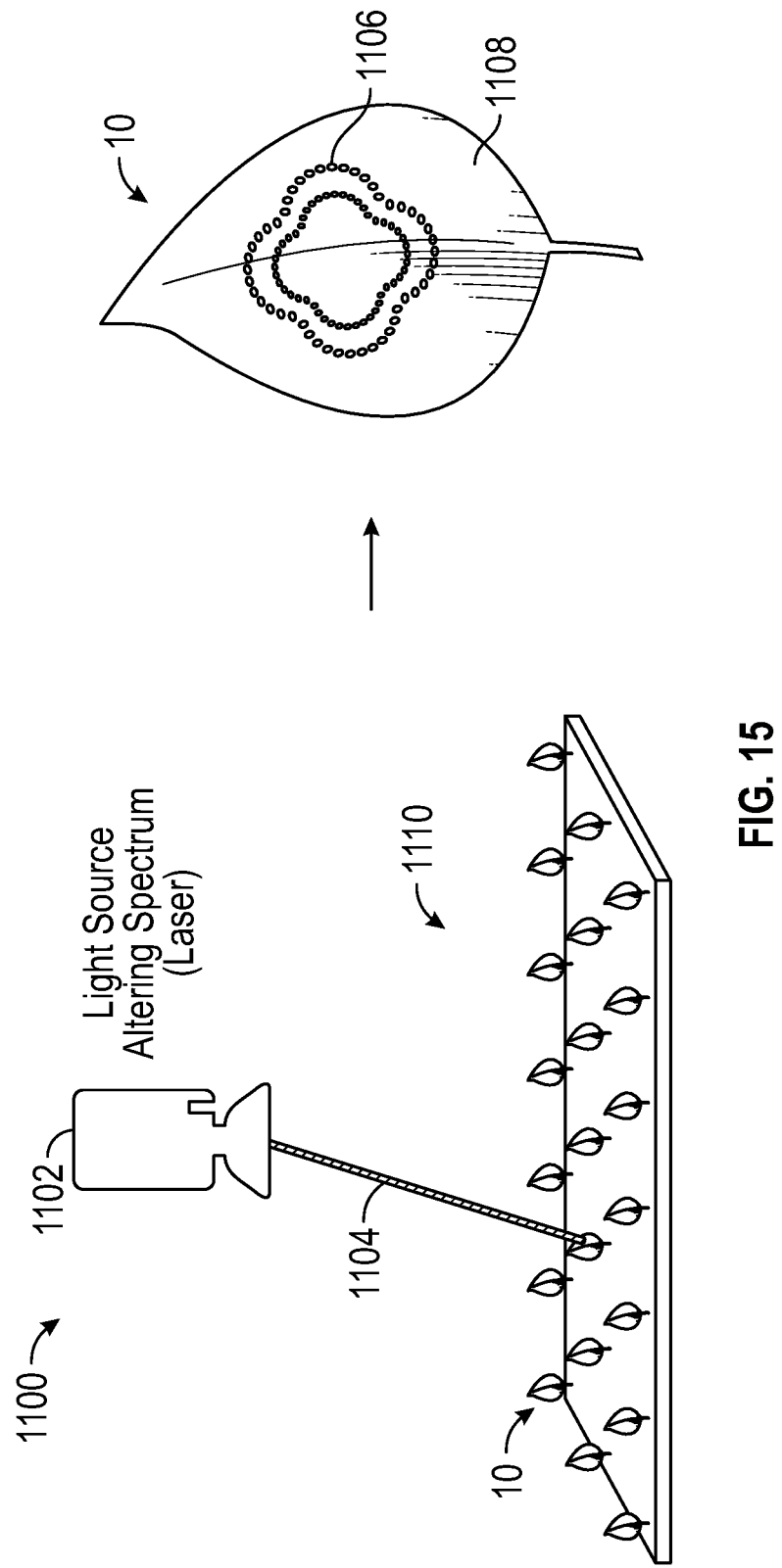
FIG. 15 depicts a plurality of plants exposed to a laser, and a light altered leaf, according to the present disclosure.

In another embodiment, referenced in FIG. 15, laser beam 1104 can be directed by laser 1102 to trace a pattern over many leaves 1110 at one time. In a preferred embodiment, leaves 1110 would be well spaced out to ensure not to shadow each other with respect to laser beam 1104. Laser 1102 could then trace the desired pattern on many leaves 1110 at once, as many times as necessary. However, if laser beam 1104 is shining onto leaves 1110 that are shadowing each other, certain patterns may be more desirable, as they will have an attractive look even if only part of the pattern 1106 strikes leaf 10. A good example of this is spots or polka dots, where a fraction of a dot on leaf 10 is acceptable. The cells in contact with laser beam 1104 are altered to have a reddish tint in the shape of the desired pattern 1106. The remaining surface area 1108 of leaf 10 is unaltered and has the original color of leaf 10 (i.e. green).

Figure 16:
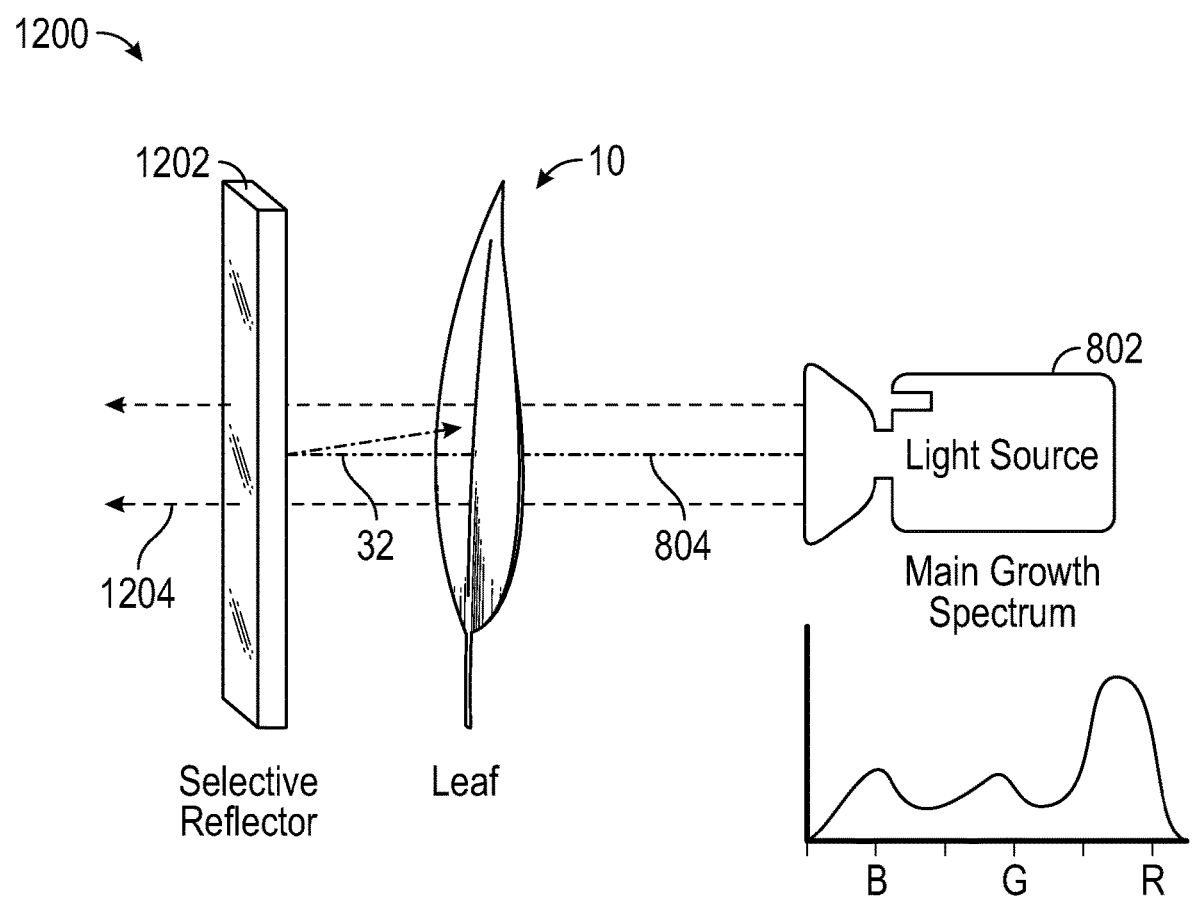
FIG. 16 depicts a leaf exposed to light on one surface and a selective reflector reflecting light onto the opposing leaf surface, according to the present disclosure.

With reference to FIG. 16, assembly 1200 includes light source 802 which emits main growth light 804 (i.e. white light) onto leaf 10. Selective reflector 1202 (i.e. mirror) reflects blue light 32 directly back onto leaf 10, which can be held in close proximity to selective reflector 1202. White light 804 can be used to illuminate leaf 10, encouraging continued growth of leaf 10, and the enhanced blue content can be achieved by selectively reflecting blue light 32 that passes through leaf 10 back into leaf 10. In a preferred embodiment, the selective reflector 1202 is a glass reflector that is patterned to match the general shape of the desired pattern wanted on the leaves. Accordingly, selective reflector can reflect blue light 32 accurately to the region where pigment shift is desired (i.e. pattern). In another embodiment, selective reflector 1202 can also be selective in the spectrum of light reflected, reflecting blue light and passing red and green light. This selectivity by wavelength can be accomplished by, but not limited to, metal choices, absorbing dies, paper/laminate choices, or by building a cold mirror using alternating layers of thin film materials of dissimilar indices, however, additional selectivity can be utilized as will be apparent to persons skilled in the art. In one embodiment, a laminate that is highly reflective (i.e. higher than 35% reflective) and highly specular (i.e. greater than 50% of reflection) in the region of 400-480 nm and less than 20% reflective in the region 480-700 nm can be used as selective reflector 1202. However, additional combinations of reflectivity and specularity will be apparent to persons skilled in the art.

With further reference to FIG. 16, the thickness of the lines 804 leaving light source 802 (i.e. red blue and green light) are indicative of the amount of power left in that color at different points in the path of the ray. Leaf 10 absorbs most of the light of all colors. Mirror 1202 returns blue light 32 that is transmitted through leaf 10. Red and Green light transmitted through leaf 10 are further transmitted through reflector 1202 (but they also could be absorbed by the reflector or scattered). Accordingly, the light passing through reflector 1202 is substantially less than was originally emitted by light source 802, therefore, lines 1204 are thinner than lines 804. Leaf 10 reflects some of each spectral content at each pass through.

In another embodiment, with reference to FIG. 17A, selective reflector 1302 can be applied using a blue ink, paint, or dye that is highly reflective to blue light 32, but absorbs other light colors. Ink applicator 1303 is used to create the desired pattern 1302 and can be applied directly to surface 1304 of leaf 10 or to a secondary reflector that is then attached to or held in close proximity to leaf 10. Light source 802 emits main growth light 804 onto leaf 10. In doing so, blue ink 1302 (i.e. desired pattern) will reflect blue light 32 onto leaf 10 and transmit the red and green light. The result is similar to those described above, referenced in FIG. 17B, the area in contact with the blue ink 1306 will have a reddish tint and the remaining surface area will be unaltered and will be the original color of leaf 10 (i.e. green). In cases where leaf 10 itself is marked, the ink used must be washed off or have degraded before use by customers. Use of a food grade ink, for example, the type used to mark citrus fruits is preferred.

Although the present disclosure has been described with reference to exemplary embodiments and implementations thereof, the present disclosure is not limited by or to such exemplary embodiments/implementations. Rather, the devices, systems and methods disclosed herein may be modified, enhanced and/or refined without departing from the spirit or scope of the present disclosure. Specifically, some embodiments mentioned in this disclosure only depict one leaf, those embodiments are not limited to only one leaf; a plurality of leaves and plants can utilize the above-mentioned technology.

The invention claimed is:

1. A method of altering the biochrome in a group of cells on a leaf, the method comprising:
   a. aligning a surface of a leaf with a light source, wherein the leaf is held in place by a backplate that includes a pattern;
   b. activating the light source to produce an altering spectrum; and
   c. directing the altering spectrum towards the leaf to create a pattern;
   wherein cells of the leaf exposed to the altering spectrum exhibit a desired pattern.

2. A method according to claim 1, wherein the backplate functions to reflect light, emit light, provide a heatsink, or combinations thereof.

3. A method according to claim 1, wherein the light source tracks movement of the leaf.

4. A method of altering the biochrome in a group of cells on a leaf, the method comprising:
   a. aligning a surface of a leaf with a light source, wherein the leaf is held in place by a backplate and the backplate includes a spectrum altering device;
   b. activating the light source to produce an altering spectrum; and
   c. directing the altering spectrum towards the leaf to create a pattern;
   wherein cells of the leaf exposed to the altering spectrum exhibit a desired pattern.

5. A method according to claim 4, wherein the spectrum altering device is phosphor.

6. A method of altering the biochrome in a group of cells on a leaf, the method comprising:
   a. aligning a surface of a leaf with a light source;
   b. positioning a filter panel between the light source and the leaf;
   c. activating the light source to produce an altering spectrum; and
   d. directing the altering spectrum towards the leaf to create a pattern;
wherein cells of the leaf exposed to the altering spectrum exhibit a desired pattern; and
wherein the filter panel is selected from the group consisting of a tinted plastic gel and a hot-mirror.

7. A method according to claim 6, wherein the filter panel removes light outside the altering spectrum.

8. A method according to claim 6, wherein the filter panel includes a pattern.

9. A method according to claim 6, wherein the filter panel is a hot-mirror provides a cutoff in the range of 450-600 nm.

10. A method according to claim 6, wherein the filter panel is a hot-mirror comprised of a stack of thin film coatings.

11. A method according to claim 10, wherein the thin film coatings comprise metallic oxides.

12. A method of altering the biochrome in a group of cells on a leaf, the method comprising:
   a. aligning a surface of a leaf with a light source, wherein the light source is a laser;
   b. activating the laser to produce an altering spectrum;
   c. directing the altering spectrum towards the leaf to create a pattern; and
   d. providing a sensor, wherein the sensor detects the color of the targeted cells to facilitate determination if further illumination from the laser is required to meet the targeted biochrome;
wherein cells of the leaf exposed to the altering spectrum exhibit a desired pattern.

13. A method according to claim 12, wherein the laser is directed to trace at least one pattern on a leaf.

14. A method according to claim 12, wherein the laser uses a diffraction lens to create patterns of high and low intensity light on a leaf.

15. A method of altering the biochrome in a group of cells on a leaf, the method comprising:
   a. aligning a surface of a leaf with a light source, wherein the light source is a laser;
   b. activating the laser to produce an altering spectrum;
   c. directing the altering spectrum towards the leaf to create a pattern; and
   d. providing a selective reflector, and wherein the selective reflector reflects the altering spectrum light back into the leaf;
wherein cells of the leaf exposed to the altering spectrum exhibit a desired pattern.

16. A method according to claim 15, wherein the selective reflector is a laminate with a reflectivity greater than 35 percent and a specularity greater than 50 percent in the region of 400-480 nm and less than 20 percent reflective in the region of 480-700 nm.

17. A method of altering the biochrome in a group of cells on a leaf, the method comprising:
   a. aligning a surface of a leaf with a light source;
   b. activating the light source to produce an altering spectrum; and
   c. directing the altering spectrum towards the leaf to create a pattern;
wherein cells of the leaf exposed to the altering spectrum exhibit a desired pattern; and
wherein the light source tracks movement of the leaf.

18. A method according to claim 17, wherein exposure of the leaf to the altering spectrum is effective to create the desired pattern that is selected from the group consisting of at least one geometric shape, at least one alphanumeric symbol, at least one trademarked image or symbol, and combinations thereof.

19. A method according to claim 17, wherein exposure of the leaf to the altering spectrum is effective to create the desired pattern that is repeated on more than one leaf and kept substantially the same despite geometric changes between the leaves.

20. A method according to claim 17, wherein the biochrome of the cells of the leaf exposed to the altering spectrum is altered by increasing the relative amount of biochromes in the cells of the leaf exposed to the altering spectrum.

21. A method according to claim 20, wherein the biochrome of the leaf includes at least one flavonoid, at least one carotenoid or a combination thereof.

22. A method according to claim 17, wherein exposure of the cells of the leaf to the altering spectrum shifts a color of the cell of the leaf to a redder color as measured by the color coordinates of light reflected from the leaf when illuminated by a standard light source.

23. A method according to claim 17, wherein the altering spectrum contains at least 25% of photons in the region between 400-480 nm.

24. A method according to claim 17, wherein the light source is in direct contact with the leaf.

25. A method according to claim 17, wherein the light source forms a defined pattern and emits altering spectrum light only from the defined pattern.

26. A method according to claim 17, wherein the light source forms a defined pattern and emits altering spectrum light from everywhere except the defined pattern.

27. A method according to claim 17, wherein the light source is selected from the group consisting of an LED, an LCD and combinations thereof.

28. A method according to claim 17, wherein the light source moves as the leaf grows.

29. A method according to claim 17, further comprising a second light source, and wherein the second light source emits a main growth spectrum.

30. A method according to claim 17, further comprising a mask, and wherein the mask is positioned between the light source and the leaf, and wherein the mask blocks a portion of the light directed toward the leaf.

31. A method according to claim 17, further comprising a panel that separates the light source from the leaf.

32. A method according to claim 31, wherein the panel comprises a phosphor portion that converts a portion of the altering spectrum to a spectrum elsewhere within the photosynthetically active region.

33. A method according to claim 32, wherein the phosphor is selected from the group consisting of a paint, an adhesive and combinations thereof.

* * * * *